July 29, 1969

G. C. GAINER ET AL 3,458,747

ELECTRIC LAMP WITH IMPROVED INTEGRALLY-MOLDED FOAMED PLASTIC
BASE HAVING INTERNAL STRESS-RELIEVING MEANS

Filed Oct. 3, 1966

WITNESSES
Theodore F. Wrobel
Robert C. Baird

INVENTORS
Gordon C. Gainer
and Russell M. Luck
BY
D. S. Buleza
AGENT

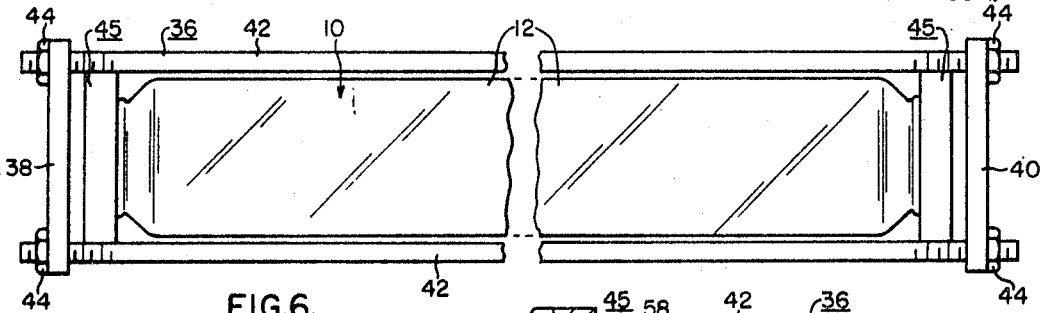
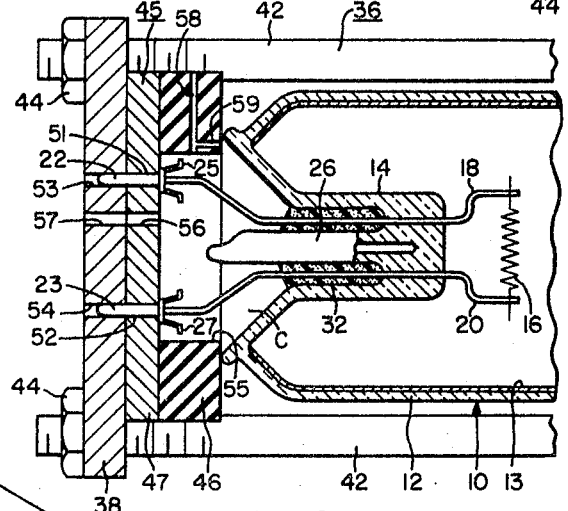
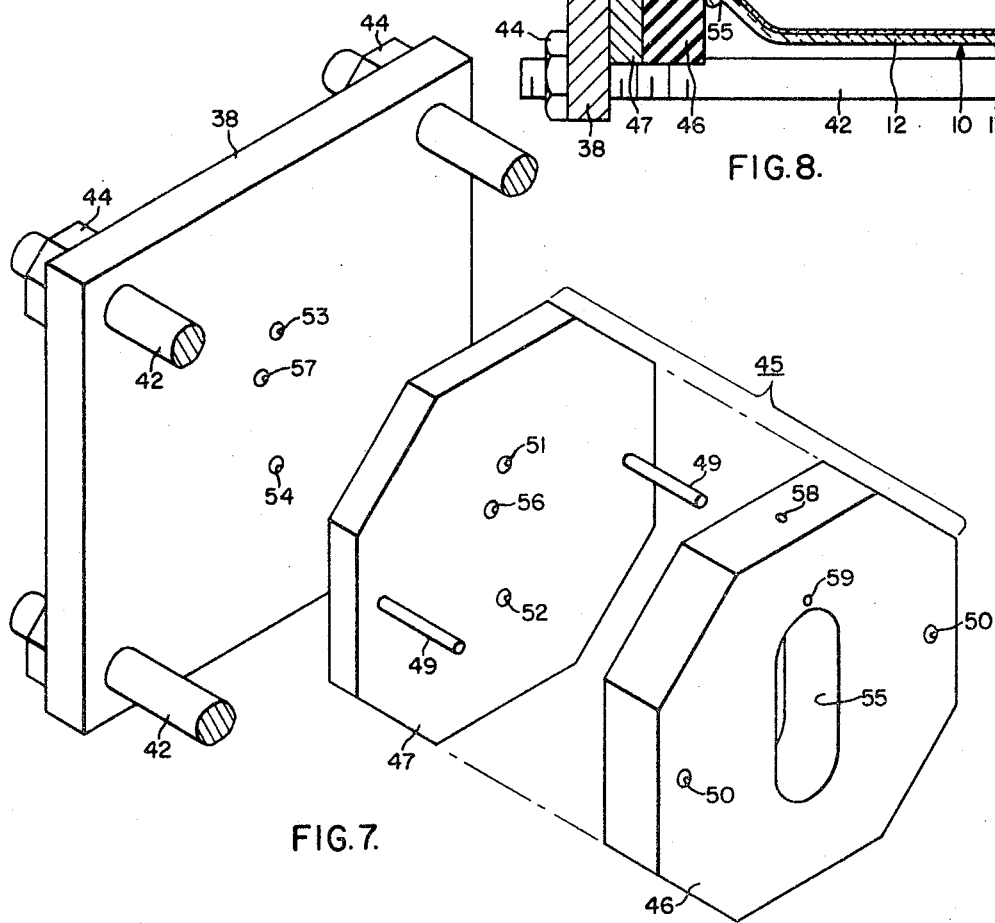

United States Patent Office 3,458,747
Patented July 29, 1969

3,458,747
ELECTRIC LAMP WITH IMPROVED INTEGRALLY-MOLDED FOAMED PLASTIC BASE HAVING INTERNAL STRESS-RELIEVING MEANS
Gordon C. Gainer, Pittsburgh, and Russell M. Luck, Monroeville, Pitcairn, Pa., assignors to Westinghouse Electric Corporation, Pittsburgh, Pa., a corporation of Pennsylvania
Filed Oct. 3, 1966, Ser. No. 583,657
Int. Cl. H01j 5/56, 5/62, 5/48
U.S. Cl. 313—318      15 Claims

ABSTRACT OF THE DISCLOSURE

The end of an electric lamp, and more particularly a tubular fluorescent lamp, is provided with a base of foamed plastic that is molded in situ directly onto the outer surface of the glass stem that is sealed to the end of the lamp envelope. The foamed plastic fills the stem cavity and stresses produced during plastic curing and by subsequent variations in ambient temperature are relieved by the inclusion of a release agent (such as a fluorocarbon polymer-base aerosol or Carnauba wax) at the plastic-glass interface, or by prefilling the inner end of the stem tube with plastic foam of lower density and greater resiliency than that of the outer portion of the base. A preformed foamed plastic plug of low density can also be used as the stress-relieving means.

---

A method for forming and concurrently attaching such bases to stem portions of sealed-in electric lamps and to the stems at both ends of a sealed-in fluorescent lamp while simultaneously controlling the overall length of the finished lamp is also disclosed.

This invention relates to electric lamps and has particular reference to an improved base structure for fluorescent lamps, and to a method for manufacturing lamps having such structures.

As presently manufactured, fluorescent lamps are provided with preformed phenolic base members that are connected to each end of the bulb after the latter has been sealed. Since millions of such lamps are manufactured each year the expense involved in separately forming such bases, transporting them to lamp-basing machines, and then attaching them to the sealed-in lamps is considerable and materially increases the manufacturing cost of the finished product.

With the foregoing cost factors in mind, it has been proposed that the plastic bases be molded directly in place on the sealed ends of the lamp envelope by utilizing a foaming thermosetting plastic resin and a suitable mold that is disposed in sealed relationship with the bulb end. In accordance with the aforesaid proposal, the end of the tubular bulb is seated in the mold and the foamable resin is introduced into the mold cavity and cured to form a cellular plastic base that is bonded directly to the end of the lamp. A molded foamed-plastic base of this type is disclosed and claimed in copending application Ser. No. 554,493 of Vernon L. Plagge, filed June 1, 1966, which application is entitled "Electric Lamp Having In Situ Molded Base of Foamed Plastic," now Patent No. 3,413,-511 and is assigned to the assignee of the present invention. A method of concurrently forming and attaching such a foamed plastic base to the end of a lamp envelope is disclosed and claimed in copending application Ser. No. 721,-730 filed Apr. 16, 1968, which application is a division of the aforesaid Plagge application.

While molding cellular plastic bases "in situ" on the ends of the lamp in accordance with the teachings of the aforementioned copending Plagge application drastically reduces the labor and material costs, cold cycling tests have shown that when the base is of conventional cap-like configuration the encircling collar portion of the base, even though composed of foamed plastic and inherently resilient, may contract sufficiently at extremely low temperatures (—30° C.) to mechanically stress and damage the enclosed portion of the glass bulb.

The filling of foamed plastic in the hollow stem also produces thermally-induced stresses in the glass, particularly at the junction of the tipped-off exhaust tube and the stem. The shrinkage forces generated when the newly-formed foamed base member is cooled sometimes causes the stem to fracture at this point, thus ruining the lamp. It was also found that such cooling and subsequent thermal-cycling could cause the glass stem to spall and crack if the plastic was of a type that effected a very tight or tenacious bond with the glass.

In addition, the variations in the bulb diameter in the seal region make it very difficult to seat the bulb end against the mold periphery and form a neat-looking base of conventional cap-like shape.

It is accordingly the general object of the present invention to provide an improved "in situ" molded foamed plastic base structure for an electric lamp or similar device.

A more specific object is the provision of a fluorescent lamp having foamed plastic base members that are molded directly onto the bulb ends and which do not impair the quality of the finished lamp.

A further object is the provision of a fluorescent lamp having integrally-molded foamed plastic bases that are attractive, economical and rugged, and which inherently protect the glass envelope from excessive stresses during the base-forming operation and under extremely low ambient temperature conditions.

Briefly, the aforesaid objects and other advantages are achieved according to the present invention by correlating the configuration and composition of the foamed thermosetting plastic base in such a manner that thermally-induced stresses on the inherently weak glass components of the lamp structure are either eliminated or reduced to safe limits. Preferably, the base is fabricated from foamed polyurethane that is molded in such a way that the base structure does not extend around or enclose any part of the lamp envelope and is bonded solely to the exterior surfaces of the glass stem. The molded base members thus effect a plug-like fit with the sealed ends of the bulb and inherently eliminate the danger of compressively stressing the bulb at extremely low temperatures.

Stresses at the glass-to-plastic interface are relieved by coating the outer surface of the stem with a material that serves as a release agent when the resin is foamed and cured. The stress-sensitive and inherently weak portions of the stem, such as the press seal and the seal juncture between the exhaust tube and stem, are protected by filling the inner end of the stem tube with a plastic foam that is of much lower density, and is thus proportionately less rigid, than the foam used in the body portion of the base.

According to a preferred embodiment, the cellular plastic bases are molded flush with the ends of the bulb and protectively enclose the tip of the exhaust tube. Alternative base structures and a method for forming and attaching such bases to both ends of the fluorescent lamp in a single operation and maintaining the overall lamp length within preselected limits are also disclosed.

A better understanding of the invention will be obtained by referring to the accompanying drawings wherein:

FIG. 6 is an elevational view of one form of basing apparatus for practicing the present invention and illustrates the manner in which the lamp is held during the base-forming operation;

FIG. 7 is an exploded perspective view on an enlarged scale of one end of the basing apparatus; and FIG. 8 is an enlarged sectional view of one end of the apparatus and the associated portion of the lamp illustrating the manner in which the mold elements cooperate with the end of the bulb to provide the desired mold cavity.

While the invention can be used with advantage in the manufacture of various types of lamps or electrical devices that require an insulative base member to protect the sealed end of the envelope and hold the device terminals in the desired position, it is especially adapted for use in conjunction with fluorescent lamps and has accordingly been so illustrated and will be so described.

EMBODIMENT I

Figure 1:
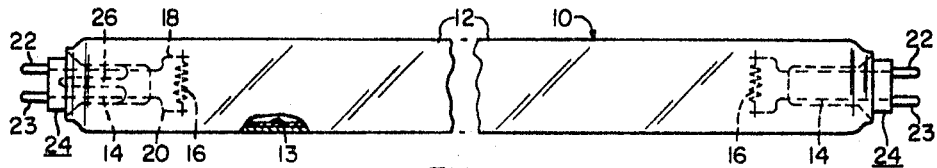
FIGURE 1 is an elevational view of a fluorescent lamp that is provided with integrally-molded foamed plastic bases according to the present invention.

With specific reference to the drawing, in FIG. 1 there is shown a fluorescent lamp 10 which embodies the present invention and includes the usual tubular light-transmitting vitreous envelope 12 that is closed at each end by re-entrant glass stems 14 sealed to the respective ends of the envelope. A cathode 16 is located at each end of the envelope and is held in such position by lead wires 18 and 20 that are sealed through the respective stems 14. The outer ends of the lead wires are connected to suitable terminals such as hollow metal pins 22 and 23 that are held in predetermined spaced apart relationship by molded cellular plastic base members 24.

The envelope 12 is interiorly coated with a layer 13 of suitable ultraviolet-responsive phosphor and one of the stems 14 is provided with the usual glass exhaust tubulation 26. After the envelope 12 has been evacuated, gas filled, and dosed with a predetermined amount of mercury, the exhaust tube 26 is tipped off in accordance with standard lamp-making practice.

Figure 2:
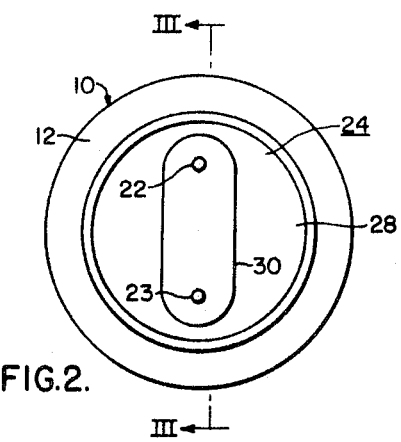
FIG. 2 is an enlarged plan view of one end of the lamp shown in FIG. 1.
Figure 3:
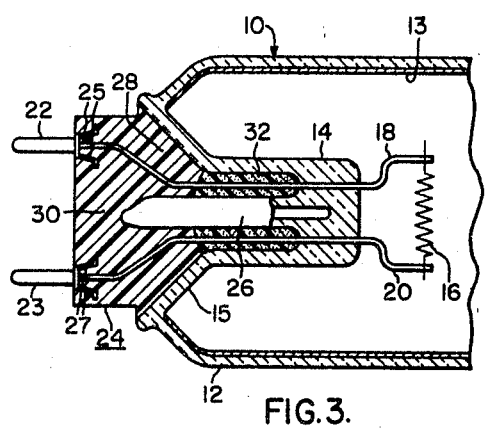
FIG. 3 is a cross-sectional view through one end of the lamp, along the line III—III of FIG. 2.

As shown more particularly in FIGS. 2 and 3, the foamed thermosetting plastic base 24 according to this embodiment consists of a body portion 28 that is disposed within the conical-shaped cavity formed by the flared portion 15 of the stem 14 and has a flat end face that is flush with the peripheral rim of the envelope 12. An integral boss portion 30 projects beyond the end face of the body portion 28 and, thus, beyond the end of the envelope.

As will be noted in FIG. 2, the boss portion 30 of the base 24 is centrally located with respect to the lamp axis and is elongated in a lateral direction and so shaped as to have parallel sides and rounded ends. The terminal pins 22 and 23 are located at opposite ends of the boss 30 and are firmly anchored therein by means of burrs or tongues 25 and 27, respectively (see FIG. 3) that extend from the flanged ends of the pins and are embedded in the foamed plastic. This type of base is preferred in those cases where the exhaust tube 26 is tipped off long since the added length provided by the boss 30 insures that the exhaust tube is completely enclosed by the base 24. This not only protects the exhaust tube but gives the lamp a more attractive finished appearance.

As will be noted in FIG. 3, the phosphor coating 13 extends to the very ends of the envelope 12. Since the body portion 28 of the plastic base 24 is terminated flush with the end of the envelope 12 and no part of the base structure overlies or masks any portion of the envelope, the lamp 10 when energized will emit light throughout the entire length of the envelope. The light output will thus be higher than in the case of conventional lamps having bases with collars that enclose and mask the ends of the bulb.

An important feature of the present invention is the concept of relieving stresses at the inner end of the stem cavity by means of a plug-like filling of foamed plastic that is of lower density and strength than the foamed plastic used in the base proper. As shown in FIG. 3, a filling 32 of the foregoing character is placed in the inner end of the stem tube cavity so that it overlies the juncture between the stem 14 and the exhaust tube 26 and also encloses the adjacent portion of the latter. This inner filling may be formed from the same plastic resin as that used for the base proper, except that it contains a larger quantity of foaming agent and is free-foamed at atmospheric pressure so as to have a much lower density.

The filling 32 can also constitute a preformed plug of foamed plastic that is inserted into the stem cavity before the base 24 is molded and bonded to the flared portion 15 of the stem 14. In either case, the filling 32 is sufficiently resilient to compensate for the differences in the rates of expansion and contraction of the glass stem 14 and the higher-density foamed plastic base 24 and thus relieves stresses that otherwise would develop in this very critical area with sudden temperature changes. Since the press seal areas of the stems 14 are also stress-sensitive, the aforesaid filling is also used on the nontubular stem at the opposite end of the lamp.

As shown in FIG. 3, the lead wires 18 and 20 extend through the press seal formed on the inner end of the stem 14, through the inner filling 32 of foamed plastic and thence into the flared portion of the stem cavity through the body portion 28 of the base 24, and into the respective hollow metal pins 22 and 23 anchored in the protruding boss 30. The lead wires are thus embedded in and completely insulated from one another by the foamed plastic.

EMBODIMENT II

Figure 4:
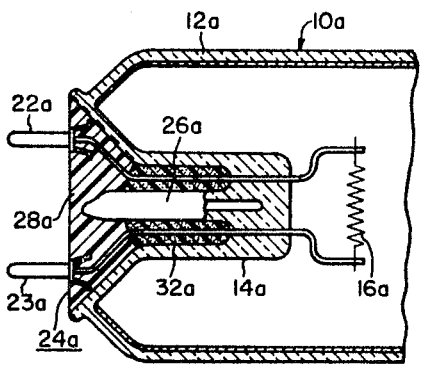
FIGS. 4 and 5 are similar views of lamps having alternative base structures.

In FIG. 4 there is shown an alternative base structure 24a which consists solely of an exterior body portion 28a and an inner fill portion 32a. The end face of the base 24a is substantially flat and lies in a plane that is tangent to the peripheral rim of the envelope 12a. The exhaust tube 26a is tipped off short so that it is recessed within the stem tube cavity and is thus completely enclosed by the base. This embodiment thus provides a rugged base structure which has a neat finished appearance, affords the necessary protection for the tipped-off segment of the exhaust tube, and is very economical since it reduces the amount of plastic resin required per lamp to a minimum.

EMBODIMENT III

Figure 5:
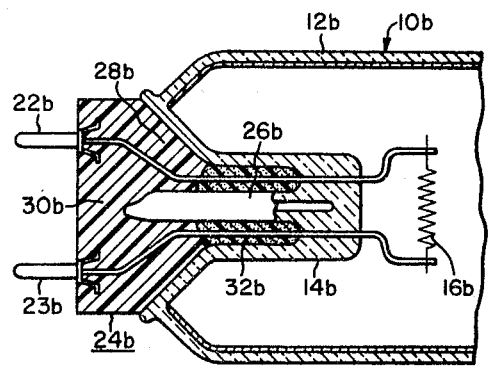

In FIG. 5 there is shown another form of the invention wherein a fluorescent lamp 10b is provided with a base structure 24b of foamed thermosetting resin which includes a low-strength inner filling 32b and a rigid dense body portion 28b as in the previous embodiments. However, according to this embodiment the body portion 28b is not terminated flush with the ends of the envelope 12b but extends outwardly and forms a cylindrical extension or boss 30b in which the terminal pins 22b and 23b are anchored. The overall configuration thus closely resembles that of a conventional base but avoids the quality and cost problems associated with such cap-like base structures.

Apparatus and method of assembly

In FIG. 6 there is shown one form of apparatus for molding foam plastic bases on both ends of a fluorescent lamp and concurrently controlling the critical length dimensions of the based lamp in accordance wth the present invention. As illustrated, the apparatus comprises a jig 36 that includes a pair of spaced end plates 38 and 40 which are held in spaced apart relationship by four rods 42, each of which have threaded ends that are fitted into appropriately located holes in the plates. The plates and rods are locked in assembled relationships by nuts 44 so that the spacing between the plates can readily be adjusted by tightening or loosening the nuts.

As shown in FIG. 6, the sealed-in fluorescent lamp 10 is placed within the jig 36 between a pair of mold assemblies 45 that are seated against the respective end plates 38 and 40 within the framework formed by the rods 42. The mold assemblies 45 are identical and, as shown more particularly in FIG. 7, consist of a facing member 46 of suitable resilient material, such as silicone rubber, and a metal backup plate 47 that are aligned with one another and held in abutting relation by a pair of lugs 49 on the plate that are inserted into appropriately located holes 50 in the facing member. The backup plate 47 is provided with a second pair of spaced apertures 51 and 52 that are disposed one above the other and are aligned with a set of apertures 53 and 54 in the end plate 38 when the mold assembly 45 is seated against the end plate.

The resilient facing member 46 has a centrally-located elongated cut-out 55 that is aligned with the apertures 51, 52 in the backup plate 47 and has rounded ends which extend beyond the respective apertures. This cut-out defines the portion of the mold that forms the boss portion of the base during the molding operation. Venting of the mold cavity is achieved by a passageway 58 that extends from the upper end of the cut-out 55 to the upper edge of the facing member 46, and by a second laterally-extending aperture 59 that is located above the cutout. A central opening 56 in the backup plate 47 and a similarly located opening 57 in the end plate 38 provide a passageway that communicates with the cut-out 55 and thus provides means for injecting the foamable resin into the mold cavity.

As is shown in FIGS. 6 and 8, the sealed-in fluorescent lamp 10 to be based is placed within the jig 36 between the mold assemblies 45 with the sealed edges of the envelope 12 seated against the resilient facing member 46. Concurrently, the flanged metal pins 22 and 23, which are attached as by soldering to the lead wires 18 and 20 before the lamp is inserted into the jig, are threaded into the openings formed by the aligned apertures 51–53 and 52–54 in the backup plate 47 and end plate 38, respectively. The nuts 44 are then tightened until the rim at each end of the envelope 12 effects an air-tight seal with the respective resilient facing members 46 and the distance between the backup plates 47 corresponds to the base-to-base length desired for the finished lamp.

Due to the inherent stiffness of the lead wires 18 and 20, the flanged portions of the terminal pins 22 and 23 automatically seat against the inner face of the backup plates 47 so that the pins project a predetermined distance outwardly from the aforesaid surface and, thus, the outer face of the foamed plastic base which is subsequently formed.

Before the lamp 10 is placed into the jig 36, the inner ends of the respective stems 14 are each filled with a low-density plug 32 of resin that is freely foamed in place or fabricated from a prefoamed resin.

As is shown in FIG. 8, when the lamp 10 is clamped in the jig 36 in the foregoing manner, the exposed conical surfaces of the stems 14 together with the respective facing members 46 define a cavity C at each end of the lamp that is vented to the atmosphere by the passageways 58–59 and is accessible through the end plate 38 and backup plate 47 through another passageway provided by the aligned openings 56 and 57. The foamable thermosetting plastic resin is then injected into the mold cavity C through this latter passageway and the hole 57 is immediately plugged. As the resin expands, it fills the cavity C and flows into contact with the flared surfaces of the stem 14. The protruding tip of the exhaust tube 26 and the portions of the lead wires 18 and 20 and anchoring tongues 25 and 27 of the terminal pins that are located in the mold cavity C are thus encased in the foamed resin. The operation is repeated at the other end of the lamp 10 and the entire assembly is then placed into an oven and the foamed resin is heated until it cures and forms the rigid cellular plastic base structures.

After the assembly has cooled, the rods 42 are loosened and the based lamp is removed from the jig 36.

While the basing apparatus and method is described above in terms of a series of manual operations, it will be apparent to those skilled in the art that these operations can be readily automated and the process performed by an automatic high-speed lamp-basing machine wherein the pin threading, length gauging, resin injection and curing etc. would be carried out by suitably designed and actuated mold assemblies as the lamp and its associated holding means are indexed to the various stations of the machine.

Specific examples

Excellent results have been obtained by fabricating the base members and the filler plug from a two-part catalyzed polyurethane resin system consisting of a diisocyanate and a polyol containing a catalyst and precise amounts of water as the foaming agent. Various halogenated hydrocarbons, such as Freon 11 (trichlorofluoromethane), can also be used as the foaming agent, or to increase the rate of foaming.

When polyurethane foam having a density greater than 25 pounds per cubic foot was used to form the base members, it was found that the polymerized rigid body of foam bonded or adhered to the stem to such a degree that the glass spalled or cracked when the foam cooled, or the based lamps were thermally cycled. It was found that the spalling problem could be overcome by coating the outer surface of the stem, prior to the introduction of the foamable resin, with a material that would serve as a release agent at the plastic-glass interface. Specific examples of suitable materials that can be so coated and provide this function are fluorocarbon polymer-base aerosols and a saturated solution (room temperature) of Carnauba wax in toluene.

Despite the use of such release agents, however, it was found that cracks still occured at the stem press and, in the case of the tubulated stem, at the point where the exhaust tube was sealed to the neck of the stem. An analysis of the cracked stems revealed that the shrinkage forces and mechanical stresses generated by the cooling and rigidification of the foamed resin are concentrated on the exhaust tube and in the press seal region and cause the glass to fracture at the neck or inner end of the stem. The use of the aforementioned low-density filler plug of foamed resin in the inner ends of the stem tubes relieves the stresses in these areas since the plug is of low strength, is resilient and inherently produces extremely low shrinkage forces upon cooling and curing. Consequently, little if any external mechanical stress is applied to the glass seals and the stems remain intact.

A sufficient amount of the admixed polyurethane prepolymer and foaming agent is introduced into the mold cavity such that the foam plastic base formed at the ambient pressure within the cavity has a density of approximately 22 to 25 pounds per cubic foot. The stress-relieving filler plug located at the inner end of the stem, one the other hand, preferably has a density of approximately 2 to 10 pounds per cubic foot. Comparative tests have shown that polyurethane foam having the latter density is very weak and will "give" at torque loadings less than 0.25 foot pounds at 100° C., whereas bases made of the same resin but having aforesaid density of 22 to 25 pounds per cubic foot are sufficiently rigid so that the teerminal pins will withstand a torque of 1 foot pound at 100° C. This is more than sufficient to enable the lamp to be placed into its socket and removed without any danger of the pins tearing away from or fracturing the cellular plastic bases, and to hold the terminal pins in place when the socketed lamp is operated at its rated wattage.

Satisfactory prototype 20 watt and 40 watt T12 flourescent lamps have been made using the apparatus shown in FIG. 6 and the following procedure. After the stems were coated with a suitable release agent and the free-foamed inner plugs were formed at each end of the sealed-in lamp, the lamp was clamped in the jig and the end plates preheated to 50° C. A weighed amount of polyurethane prepolymer (viz., 1.92 grams of polyether polyol containing 0.3 gram of water per 128 grams of polyol, and 1.5 grams of modified toluene diisocyanate), was rapidly mixed (15 seconds), and 1.5 grams of the prepolymer was loaded into a hypodermic syringe and injected into the mold cavity through the hole in the end plate which was immediately plugged. The whole assembly was then placed into an oven and heated to 100° C. for 10 to 15 minutes to cure the polyurethane foam.

Under the aforesaid conditions, the total time required for mixing, injecting and foaming was approximately 40 to 45 seconds. The resulting rigid foamed polyurethane bases repeatedly withstood thermal cycling tests in which the finished lamp was rapidly cooled from a temperature of approximately 28° C. to −30° C., and then reheated.

A very attractive base of foamed polyurethane plastic having a white body color can be readily obtained by including a predetermined amount of titanium dioxide pigment in the prepolymer. In the aforesaid example, a very staisfactory white body color was obtained by adding 5% by weight of such a pigment to the resin formulation.

It will be appreciated from the foregoing that the objects of the invention have been achieved insofar as a very rugged and economical foamed plastic base structure for a fluorescent lamp or similar device has been provided which inherently compensates for the differences in the coefficients of thermal expansion between the foamed plastic and the glass stem and thus relieves mechanical stresses that would otherwise develop and possibly damage the lamp. The base structure is of such configuration that it does not overlie or enclose any portion of the lamp envelope and thus completely eliminates the compressive stress problem encountered with solid plastic bases of conventional configuration. The improved base construction also increases the effective lighted length of the finished lamp and materially reduces the amount of plastic material required per lamp—thereby reducing the cost of the lamp and increasing its light output.

While several lamp embodiments and a preferred method for fabricating the base and terminal structure of the present invention have been illustrated and described, it will be appreciated that various modifications can be made without departing from the spirit and scope of the invention. For example, any suitable thermosetting resin or polymer can be used in place of the polyurethane resin system referred to in the foregoing description.

We claim:
1. In an electric lamp, the combination of;
a light-transmitting envelope that is closed at one end by a vitreous re-entrant stem that defines a cavity which extends inwardly from the end of said envelope,
a lead wire sealed through said vitreous stem and extending through said cavity,
a terminal attached to the protruding end of said lead wire,
a base member comprising a molded body of rigid foamed thermosetting plastic that substantially fills said cavity and is bonded directly to said vitreous stem, and
stress-relieving means located within the stem cavity and disposed between a portion of the outer surface of said stem and said foamed plastic base member,
said lead wire and the adjoined portion of said terminal being embedded in said rigid foamed plastic body and disposed so that the exposed portion of said terminal is held at a predetermined location on the end of said envelope,
said foamed plastic body being of such configuration and cross-sectional dimensions that it is bonded solely to said vitreous stem and is spaced from the proximate circumferential surfaces of the envelope proper.

2. The combination set forth in claim 1 wherein; a pair of spaced lead wires are sealed through said stem and are attached to a pair of spaced terminals that are embedded in and extend beyond said base member, and the density and composition of said molded foamed plastic base member are such that it remains sufficiently rigid at 100° C. to hold said terminals in fixed spaced relationship when they are subjected to a torque of approximately 1 foot pound.

3. The combination set forth in claim 1 wherein;
said lamp has a predetermined wattage rating,
a tipped-off vitreous exhaust tube is joined to said vitreous stem and protrudes outwardly therefrom into said cavity,
the inner portion of said molded foamed plastic base member that surrounds the juncture between said exhaust tube and vitreous stem is of such density that it is sufficiently resilient to compensate for the difference in the coefficients of thermal expansion between the plastic and the vitreous stem and thus constitutes said stress-relieving means, and the outer portion of said foamed plastic base member has a density which is greater than that of said inner portion and sufficient to enable said base member to hold said terminal at said predetermined location when the lamp is placed into the its socket and operated at its rated wattage.

4. The combination set forth in claim 1 wherein said plastic base member is composed of foamed polyurethane resin that has a density in the range of approximately 22 to 25 pounds per cubic foot.

5. The combination set forth in claim 1 wherein;
said plastic base member is composed of foamed polyurethane resin, and
said stress-relieving means comprises a material that is disposed at the interface of said foamed polyurethane base member and vitreous stem and constitutes a release agent that reduces the stresses produced at said interface due to the difference in the coefficients of thermal expansion of said vitreous stem and said foamed polyurethane.

6. The combination set forth in claim 5 wherein said stress-relieving material comprises a substance selected from the group consisting of a fluorocarbon polymer-base aerosol and carnauba wax.

7. The combination set forth in claim 1 wherein;
said lamp comprises a fluoroescent lamp that has a tubular glass envelope which is closed at each end by a stem,
a pair of lead wires are sealed through each of said stems and have terminals attached to their outer ends,
said terminals comprise hollow metal pins,
each of said stems is also composed of glass and is sealed to the rim of said envelope and defines a re-entrant generally conical-shaped cavity,
a plastic base member is bonded to each of said stems,
said base members are composed of foamed polyurethane resin that has a density in the range of approximately 22 to 25 pounds per cubic foot, and
said stress-relieving means comprises a material that is disposed at the interface of each of said foamed polyurethane base members and said glass stems and constitutes a release agent that reduces the stresses produced at said interface under varying ambient temperature conditions.

8. The combination set forth in claim 7 wherein said foamed polyurethane contains a predetermined amount of titanium dioxide and has a white body color.

9. The combination set forth in claim 7 wherein the exposed face of each of said foamed polyurethane base members is substantially flat and disposed in a plane that is substantially tangent to the rim of said envelope.

10. The combination set forth in claim 7 wherein;
a tipped-off segment of a glass exhaust tube is fused to the inner end of one of said stems and extends outwardly therefrom into the stem cavity, the exposed face of the associated foamed polyurethane base member is substantially flat and disposed in a plane that is substantially tangent to the rim of said envelope, and the sealed tip of said exhaust tube segment is located within the confines of the stem cavity and is thus completely enclosed by said associated foamed plastic base member.

11. The combination set forth in claim 7 wherein;

a tipped-off segment of a glass exhaust tube is joined to the inner end of one of said stems and extends outwardly therefrom into the stem cavity and beyond the end of said envelope, and the associated foamed polyurethane base member extends beyond the end of said envelope and completely encloses the sealed tip of said exhaust tube segment.

12. The combination set forth in claim 11 wherein the portion of said associated base member which extends beyond the end of said envelope is of substantially cylindrical configuration.

13. The combination set forth in claim 11 wherein;

the portion of said associated base member which extends beyond the end of said envelope comprises a laterally elongated boss that has substantialy parallel sides and rounded ends, and said metal pins are anchored in said boss.

14. The combination set forth in claim 7 wherein;

a tipped-off segment of a glass exhaust tube is fused to the inner end of one of said stems and extends outwardly therefrom into the stem cavity, and the portion of the associated foamed polyurethane base member that fills the inner end of the stem cavity and overlies the juncture between said stem and exhaust tube segment has a density in the range of approximately 2 to 10 pounds per cubic foot and thus comprises a resilient low-strength stress-relieving plug.

15. The combination set forth in claim 7 wherein;

a tipped-off segment of a glass exhaust tube is fused to the inner end of one of said stems and extends outwardly therefrom into the stem cavity, the inner end of said stem cavity contains a preformed plug of foamed plastic that is retained in place within said stem and around the inner portion of the exhaust tube segment by the associated foamed polyurethane base member, and the density of said preformed foamed plastic plug is less than that of said associated foamed polyurethane base member.

References Cited

UNITED STATES PATENTS

| | | | |
|---|---|---|---|
| 2,163,177 | 6/1939 | Novotny | 264—272 X |
| 2,535,773 | 12/1950 | Yoder | 313—109 |
| 2,922,216 | 1/1960 | McIlvaine | 313—318 X |
| 3,064,069 | 11/1962 | Auge | 264—272 X |
| 3,077,022 | 2/1963 | Cullis | 313—318 X |
| 3,133,978 | 5/1964 | Bartley et al. | 264—45 |
| 3,153,694 | 10/1964 | Tomlinson | 264—272 X |
| 3,205,394 | 9/1965 | Ray | 313—109 |
| 3,253,179 | 5/1966 | Edwards et al. | 313—318 |

JAMES W. LAWRENCE, Primary Examiner

E. R. LA ROCHE, Assistant Examiner

U.S. Cl. X.R.

313—109; 339—144